Jan. 6, 1959     J. S. ARONOFSKY ET AL     2,867,116
METHOD OF MEASURING CHARACTERISTICS OF POROUS MATERIAL
Filed Dec. 27, 1954     2 Sheets-Sheet 1

JULIUS S. ARONOFSKY
GEORGE C. WALLICK
PAUL P. REICHERTZ
INVENTORS

BY Frederick E. Dumoulin
ATTORNEY

Jan. 6, 1959 J. S. ARONOFSKY ET AL 2,867,116
METHOD OF MEASURING CHARACTERISTICS OF POROUS MATERIAL
Filed Dec. 27, 1954 2 Sheets-Sheet 2

JULIUS S. ARONOFSKY
GEORGE C. WALLICK
PAUL P. REICHERTZ
INVENTORS

BY Frederick E. Dumoulin
ATTORNEY

United States Patent Office 2,867,116
Patented Jan. 6, 1959

2,867,116

METHOD OF MEASURING CHARACTERISTICS OF POROUS MATERIAL

Julius S. Aronofsky, George C. Wallick, and Paul P. Reichertz, Dallas, Tex., assignors, by mesne assignments, to Socony Mobil Oil Company, Inc., a corporation of New York Application December 27, 1954, Serial No. 477,664

10 Claims. (Cl. 73—38)

This invention relates to the measurement of characteristics of porous material and relates more particularly to the measurement of the permeability and porosity of porous materials such as earth material.

In many instances, it is desired to know the permeability of porous material. For example, it is often necessary to know the permeability of an earth material, such as an earth material forming the matrix of a subterranean petroleum reservoir, in order to estimate the potential total production or the rate of production of petroleum from the reservoir. For various other purposes, it may be essential or necessary to know the permeability of an earth material forming the matrix of a fluid-containing reservoir.

Ordinarily, permeability of a porous material, such as an earth material, is measured by passing a gas through a sample of the material and determining the pressure drop and the rate of flow of the gas. Knowing the viscosity of the gas and the physical dimensions of the sample, the permeability is expressed by the equation:

$$k_a = \frac{2uQL}{A \Delta P^2} \quad (1)$$

In this equation, $u$ is the viscosity of the gas in centipoises, $Q$ is the flow rate of the gas in cubic centimeters per second, $L$ is the length of the sample in centimeters, $A$ is the cross-sectional area of the sample in square centimeters, and $\Delta P$ is the difference in the absolute pressures in atmospheres between the upstream and downstream sides of the sample. The permeability of the sample, $k_a$, employing these units, is expressed in Darcys. For purposes of simplification in the measurement of the length and cross-sectional areas of the sample, a symmetrical sample such as a cylinder is usually employed.

The permeability of the earth material as determined by passing a gas through the sample and measuring the pressure drop and rate of flow of the gas is an apparent permeability, i. e., is the permeability of the sample at the mean flowing gas pressure in the sample. Stated otherwise, the permeability, as determined by this method, varies depending upon the mean flowing gas pressure in the sample. The dependency of the permeability upon the mean flowing gas pressure has been postulated as being caused by gas slip. Gas slip is related to the mean free paths of the molecules of the gas. Apparently, at low pressures and at long mean free paths, the gas molecules do not have a zero velocity at the walls of the interstices of the sample but move freely along the walls in the direction of gas flow. Accordingly, with lower pressures there is a greater gas slip and at higher pressures there is less gas slip. As a consequence, the gas is able to flow more readily at low presures and the apparent permeability is greater at these low pressures.

It is possible to obtain a value for the permeability of the sample that is dependent only upon the sample itself. This gas slip corrected permeability is obtained from determination of the apparent permeability at different mean flowing gas pressures. The apparent permeabilities are then plotted as a function of the reciprocal of the mean flowing gas pressure and the curve obtained is extrapolated to infinite pressure. The value of the zero intercept is taken as the value of the gas slip corrected permeability. By this method, however, measurement of the gas slip corrected permeability is tedious and time consuming. Further, where applied to large, massive samples of low permeability, the method suffers from severe practical limitations arising from the long time required for the rate of the flow of gas to stabilize and the difficulty encountered in measuring low rates of gas flow.

Another characteristic of porous material frequently measured is porosity. Porosity may be defined as the fraction or percentage of the bulk volume of the porous material occupied by pores or interstices. In the measurement of porosity of large samples of porous material, gas contained within the pores of the sample, which sample has a known bulk volume, is permitted to flow therefrom into a space at a known initial pressure and having a known volume. The pressure in the space is measured when equilibrium is established and, from the gas laws, the volume of gas originally in the pores of the porous material is calculated. The volume of gas is equal to the pore volume of the porus material and from this figure the porosity may be calculated. This method of measuring porosity, however, similarly to the method of measuring gas slip corrected permeability described above, suffers from the drawback of being tedious and time consuming. In the case of the measurement of the porosity of massive samples of low permeability, this is particularly true since the time required for equilibrium to be established is apt to be inordinately long. Further, slow attainment of equilibrium is often erroneously taken for establishment of equilibrium with the result that the measured porosity can be seriously in error.

It is an object of this invention to provide a method for measuring characteristics of a porous material. It is another object of this invention to provide a method for measuring the gas slip corrected permeability of a porous material. It is another object of this invention to reduce the time required to measure the gas slip corrected permeability of a porous material. It is another object of this invention to measure the gas slip corrected permeability of large samples of porous material having low permeability. It is another object of this invention to provide a means for measuring the porosity of a porous material. It is another object of this invention to reduce the time required for measuring porosity of a porous material. It is another object of this invention to improve the accuracy and precision of the measurement of gas slip corrected permeability and porosity of a porous material. Further objects of the invention will become apparent from the following detailed description.

In accordance with our invention, characteristics of a porous material are determined by a procedure characterized by establishment of a transient flow of a gas within a sample of the porous material and measurement of the time required for the pressure of the gas to attain a predetermined fraction of a specified value.

Figure 1:
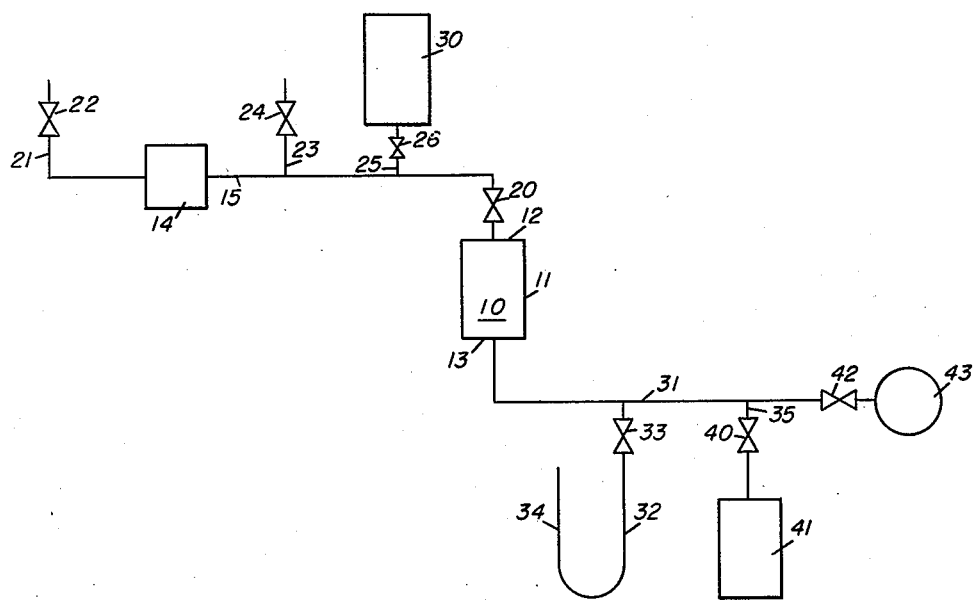
Figure 1 is a schematic diagram of apparatus that may be employed in measurement of the characteristics of porous material.

Referring now to Figure 1, a sample 10 of porous material, such as an earth material, is mounted within a cell 11. The sample, preferably, is cylindrical in shape and will be termed hereinafter for purposes of convenience as a core sample. The cell may be of any type wherein the longitudinal wall of the core sample is in gas impermeable contact with the wall of the cell. In a cell of this type, a flow of gas between the longitudinal walls of the core sample and the wall of the cell is prevented. Further, the parallel plane end faces, 12 and 13, respectively, of the core sample 10 must not contact the ends of the cell 11 so tightly that uniform flow of gas over the end faces of the core sample is prevented. On the other hand, the space between the end face 13 of the core sample and the cell is preferably as small as possible consistent with flow of gas over the end face of the core sample in order to minimize void volume of unknown value within the system. Alternatively, and preferably, the void volume is known. A rubber sleeve permeameter cell in which an external pressure can be applied to the sleeve has been found to be suitable.

Leading from the cell 11 to a pressure regulator 14 is line 15 provided with valve 20. Pressure regulator 14 is of the type that will maintain gas pressure at a fixed determined value, either above or below that of the atmosphere, and a "Nullmatic" pressure regulator has been found to be satisfactory. Connected to pressure regulator 14 is line 21 provided with valve 22. Line 21 leads to a source of pressure. Line 23 provided with valve 24 leads from line 15 and line 23 leads to a source of vacuum. Line 25 provided with valve 26 leads from line 15 to chamber 30, which chamber acts as a buffer to assist pressure regulator 14 in maintaining gas pressure at a fixed determined value.

Line 31 leads from the opposite side of cell 11. Connected to line 31 is line 32 containing valve 33 and leading to manometer 34. Also connected to line 31 is line 35 containing valve 40 and leading to chamber 41. Chamber 41 is of known interior dimensions and is adapted to contain solid plugs of known volume whereby the interior volume of the chamber may be changed to known values as desired. Connected to line 31 through valve 42 is pressure gauge 43.

The lines 31, 32, and 35 are constructed to have a narrow bore in order that the volume of gas contained therein will be insignificant as compared with the volume within the chamber 41. Alternately and preferably, the volume of the bores of lines 31, 32, and 35 is known.

Establishment of transient flow of gas in the core sample is effected by abruptly changing a gas pressure over a plane parallel end face of the core sample or other exposed portion of the core sample. Transient flow of the gas may be over the plane parallel end face of the core sample either into or out of the core sample. Thus, transient flow of gas in the core sample can be established with a change in gas pressure such that the gas pressure in the core sample is higher than the gas pressure at the other side of the plane parallel end face or such that the gas pressure in the core sample is lower than the gas pressure at the other side of the plane parallel end face. The pressure change will be one wherein the low pressure is a predetermined fraction of the high pressure, as the specified value.

In carrying out the invention in accordance with one embodiment thereof, a core sample 10 of known length, regarded as L, and known diameter is placed within the cell 11. The volume of chamber 41 is known or is measured from its physical dimensions, and contains solid plugs, if desired, to obtain a desired volume. The volume of this chamber will be regarded as $V_1$. Included in the volume $V_1$ will be the void volume between the end face 13 of the core sample and the cell 11 and the volume of the bores of lines 31, 32, and 35. Valves 24, 26, and 33 are closed and valves 20, 40, and 42 are opened. A cylinder of a gas such as nitrogen, or other source of a gas under pressure being connected to line 21 and valve 22 being opened, the core sample 10 and the chamber 41, as well as the connecting lines, are charged to a predetermined gas pressure. This gas pressure will be regarded as $P_i$. In connection with the gas employed to obtain the pressure $P_i$, its viscosity, $u$, must be known. Valve 20 is then closed and valve 26 is opened. Pressure regulator 14 is then set such that the pressure in the line 15 and chamber 30 will be maintained at a predetermined multiple of the pressure, $P_i$. In this embodiment the pressure, $P_i$, is the maximum pressure in the system, and is designated herein as $P_m$. A suitable multiple of the pressure, $P_m$, is 0.1. Thus, the pressure regulator will be set such that the pressure in the line 15 and the chamber 30 will be maintained at 0.1 $P_m$. Valve 20 is then suddenly opened and the time at which the valve is opened is noted. To achieve sudden opening, the valve 20 is preferably of the quick opening type.

As a result of the pressure in the line 15 and the chamber 30 being lower than the pressure within the core sample 10, the line 31, and the chamber 41, gas will flow from the core sample over the plane parallel end face 12 to the line 15. With flow of gas out of the core sample 10, the pressure in the lines 31 and 35 and the chamber 41 will decrease. The decrease in the pressure will be indicated by pressure gauge 43. The decrease in pressure is observed. When the pressure as indicated by the pressure gauge 43 reaches a predetermined fraction of the original pressure, $P_m$ in this case, within the core sample, the time is noted. The difference between this time and the time of opening the valve 20 is regarded as $t_1$. Suitably, the predetermined fraction of the maximum pressure, $P_m$, is 0.55. Accordingly, the time required for the pressure within the core sample as indicated by pressure gauge 43 to decrease to 0.55 $P_m$ is measured.

While transient flow of gas within the core sample can be effected as described above with a gas pressure within the core sample at a higher value than the gas pressure at the other side of the plane parallel end face 12, establishment of transient gas flow may be effected with a gas pressure within the core sample at a lower value than the gas pressure at the other side of the plane parallel end face 12. For establishment of transient flow by this means where the pressure within the core sample is below atmospheric pressure, valve 24 is opened. With valves 22, 26, and 42 closed and with valves 20, 33, and 40 open, the core sample 10, the chamber 41, and the connecting lines are reduced to a predetermined pressure below atmospheric. This pressure may be regarded as $P_i$. Valves 20 and 24 are then closed. Valves 22 and 26 are opened and pressure regulator 14 is set such that the pressure within the line 15 and the chamber 30 will be maintained at a predetermined ratio of the pressure, $P_i$, and valve 20 is suddenly opened. The pressure regulator may be set such that the pressure in the line 15 and the chamber 30 will be maintained at 10 $P_i$. It will be observed that the ratio between the high pressure and the low pressure in this case will be the same as in the case previously described where the transient flow is established with the higher pressure being within the core sample. The time at which the valve 20 is opened is observed and the time required for the pressure within the core sample 10, as measured by the manometer 34, to reach the predetermined fraction of the maximum pressure, which will be the pressure within the line 15 and the chamber 30, is measured. This time is also regarded as $t_1$.

Transient gas flow may also be effected with a gas pressure within the core sample at a lower value than the gas pressure at the other side of the plane parallel end face where the pressure within the core sample is above atmospheric. This may be accomplished by charging the core sample, the chamber 41, and the connecting lines with a gas pressure from the source of pressure connected to line 21 at a pressure above atmospheric. The pressure regulator may then be set such that the pressure within the line 15 and the chamber 30 will be maintained at a predetermined ratio of the pressure, $P_1$, within the core sample.

Following measurement of the time, $t_1$, the same procedure is repeated twice except that a change is made with respect to the maximum pressure resulting in transient flow within the core sample in the first repetition and with respect to the volume of the chamber 41 in the second repetition. The procedures as described above may be repeated except that the maximum pressure, $P_m$, will be increased or decreased. This pressure may be regarded as $\bar{P}_m$. The ratio between the high pressure and the low pressure for establishment of transient flow through the core sample will be the same as in the procedure described above. Upon opening of valve 20, the time is noted and the time for the pressure within the core sample to reach the same predetermined fraction of the maximum pressure, i. e., 0.55 $\bar{P}_m$, is measure. This time is regarded as $\bar{t}$.

Thereafter, the procedure is again repeated with the exception that the volume of the chamber 41 is changed. This changed volume is regarded as $V_2$. The chamber may be increased or decreased in volume by the addition or removal of solid plugs. The ratio between the maximum and minimum pressure is maintained as above and the maximum pressure is the same maximum pressure, $P_m$, employed as described in connection with the measurement of the time, $t_1$. The valve 20 is suddenly opened, the time is noted, and the time is measured for the pressure within the core sample as indicated by the pressure gauge 43 or the manometer 34 depending upon the pressures employed to reach the same predetermined fraction of the maximum pressure as in the two procedures described above. This time is regarded as $t_2$.

From the values of L, $u$, $V_1$, $P_m$, $t_1$, $\bar{P}_m$, $\bar{t}$, $V_2$, and $t_2$ the value of the gas slip corrected permeability, the porosity, and a measure of the rate of change of permeability with gas pressure may be determined.

We have found that the transient flow of a gas within a sample of porous material can be described by the formula:

$$\frac{bP_m}{\phi u L^2}t = A + B\left(\frac{V}{V_p}\right) \quad (2)$$

In this expression, $b$ is the gas slip corrected permeability, $P_m$ is the maximum pressure of the gas, $\phi$ is the porosity of the porous material, $u$ is the viscosity of the gas, L is the length of the core sample, $t$ is the time required for the pressure of the gas within the core sample to change to 0.55 of the maximum pressure $P_m$, V is the volume in the chamber 41, $V_p$ is the pore volume of the porous material, and A and B are mathematical constants. A detailed derivation of this expression is disclosed in an article entitled "Effective Gas Slip on Unsteady Flow of Gas Through Porous Media" by one of us, Julius S. Aronofsky, appearing in the Journal of Applied Physics, vol. 25, No. 1, 48–53, January 1954.

Figure 3:
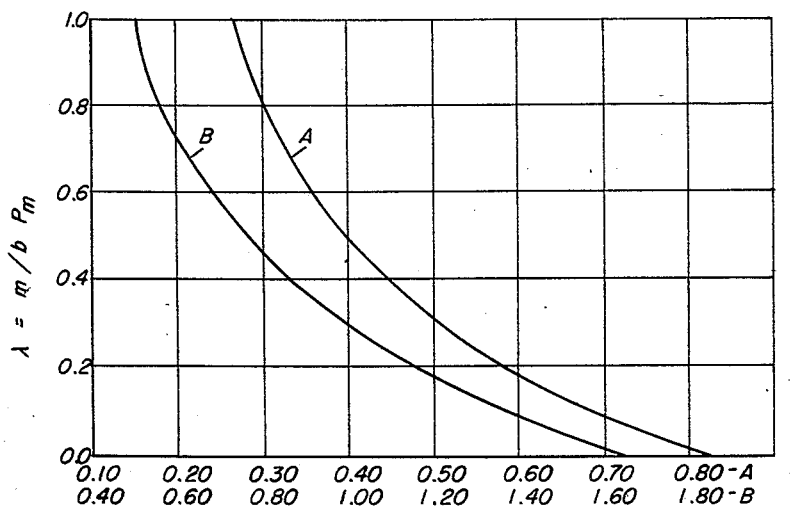
Figure 3 is a pair of curves of mathematical constants versus the product of the ratio of core sample characteristics and a gas pressure.

For any one measurement of time $t$ as described above, A and B will have constant values. The value of the constants, A and B, is dependent on the value $$\frac{m}{bP_m}$$

which, for purposes of convenience, can be expressed as $\lambda$. Analysis of the relationship of A and B with $\lambda$ has been made by us and this relationship is given in the accompanying Figure 3. The line labeled A indicates the variation in the value of the constant A with variation in the value of $\lambda$. The line labeled B indicates the variation in the value of the constant B with variations in the value of $\lambda$. In this particular case, the values for the curves A and B are for the condition whereby in the ratio between the maximum value of the high pressure and the value of the low pressure is 10 and the high pressure is within the core sample.

Figure 2:
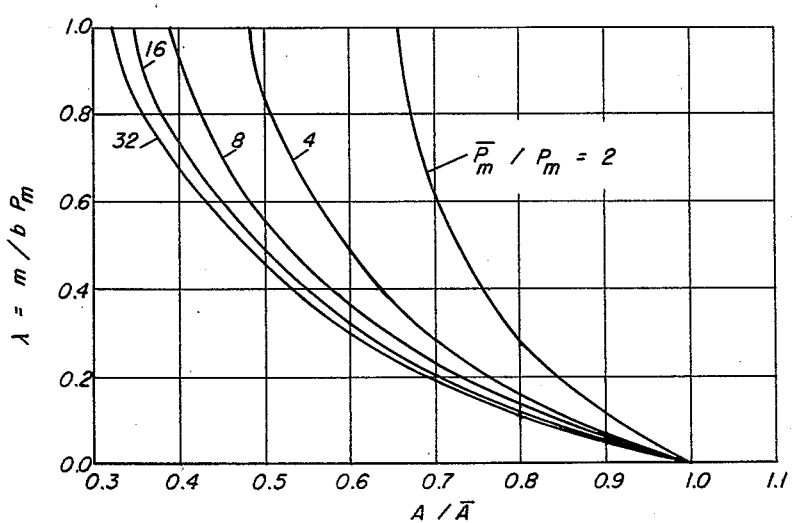
Figure 2 is a series of curves showing variation of a mathematical ratio versus the product of a ratio of core sample characteristics and a gas pressure. Each curve corresponds to a different value of a pressure ratio.

From two of the three measurements of the times for the gas pressure to reach the predetermined fraction of the maximum value, the value of the expression $$\frac{P_m t_1}{\bar{P}_m \bar{t}}$$

can be found. This value can be stated to be equal to $A/\bar{A}$. We have also found that the value of $A/\bar{A}$ for any particular set of conditions varies with the value of $\lambda$. We have determined the variation in the value of $A/\bar{A}$ with the value of $\lambda$ and this variation is shown in the curves in Figure 2. The curves are given for values of $$\frac{\bar{P}_m}{P_m}$$

of 2, 4, 8, 16, and 32. Having determined the value of $A/\bar{A}$ and since the value of the ratio of $$\frac{\bar{P}_m}{P_m}$$

is known, the value of $\lambda$ may be determined from Figure 2. If necessary, extrapolation for different values of $$\frac{\bar{P}_m}{P_m}$$

other than those given in the figure may be made. Knowing the value of $\lambda$, the value of $m/b$ can be obtained since the value of $P_m$ is known. Further, knowing the value of $\lambda$, the values of A and B can be obtained from Figure 3.

The equation $$\frac{bP_m}{\phi u L^2}t = A + B\left(\frac{V}{V_p}\right) \quad (1)$$

leads to the following expressions:

$$b = \frac{uL^2 B}{P_m V_b} \frac{(V_1 - V_2)}{(t_1 - t_2)} \quad (3)$$

$$\phi = \frac{B}{AV_b} \frac{(V_2 t_1 - V_1 t_2)}{(t_2 - t_1)} \quad (4)$$

In these expressions, $V_b$ is the bulk volume of the core sample. From Equation 3 the value of $b$ can be determined. This value is the slip corrected permeability of the core sample. Having previously determined the value of $m/b$ and now knowing the value of $b$, $m$ can be determined. The value of $m$ is a measure of the rate of change of apparent permeability with change in gas pressure. From Equation 4, the value of $\phi$ or the porosity of the core sample may be determined.

It will thus be seen that the slip corrected permeability, porosity, and other information relating to a sample of porous material may be obtained simply and quickly. It is only necessary to measure the time required for the gas pressure to reach a predetermined fraction of the maximum pressure. These is no necessity for waiting for equilibrium conditions to occur upon release of gas as required in conventional methods. Therefore, errors due to mistakes in determining the attainment of equilibrium are eliminated. Further, flow meters are not required. The procedure is particularly adapted for use in the field where measurement of the characteristics of porous material must be made quickly, with rugged instruments, and with relatively unskilled operators.

Having thus described our invention, it will be understood that such description has been given by way of illustration and example and not by way of limitation, reference for the latter purpose being had to the appended claims.

We claim:

1. The process comprising the steps of establishing gas flow communication between a porous material and a reservoir having a known volume, establishing a known gas pressure in said porous material and said reservoir, establishing a known gas pressure over an end wall of said porous material, said last mentioned gas pressure being different from said first mentioned gas pressure whereby a gas pressure differential is established at said end wall of said porous material, permitting transient flow of gas within said porous material resulting from establishment of said gas pressure differential, measuring the time required for the gas pressure within said porous material and said reservoir to attain a predetermined fraction of the higher of said two gas pressures, establishing again a known gas pressure in said porous material and said reservoir, establishing again a known gas pressure over an end wall of said porous material, said last mentioned gas pressure being different from said previously mentioned gas pressure whereby a gas pressure differential is established as said end wall of said porous material, the values of each of said two last mentioned gas pressures being different from the values of each of said two previously mentioned gas pressures but such that the gas pressure differential is the same as said previously mentioned gas pressure differential and the higher one of said two last mentioned gas pressures also being the higher one of said two previously mentioned gas pressures, permitting transient flow of gas within said porous material resulting from establishment of said last mentioned gas pressure differential, measuring the time required for the gas pressure within said porous material and said reservoir to attain the same previously mentioned fraction of the higher of said two last mentioned gas pressures, changing the volume of said reservoir, establishing a known gas pressure in said porous material and said reservoir, establishing a known gas pressure over an end wall of said porous material, said last mentioned gas pressure being different from said previously mentioned gas pressure whereby a gas pressure differential is established at said end wall of said porous material, said gas pressure differential being the same as said two previously mentioned gas pressure differentials and the values of each of said gas pressures being the same as the values of a pair of said previously mentioned gas pressures and the higher one of said two last mentioned gas pressures also being the higher one of said two pairs of previously mentioned gas pressures, permitting transient flow of gas within said porous material resulting from establishment of said last mentioned gas pressure differential, and measuring the time required for the gas pressure within said porous material and said reservoir to attain the same previously mentioned fraction of the higher of said last two mentioned gas pressures whereby the gas slip corrected permeability and the porosity of said porous material may be determined.

2. The process comprising the steps of establishing gas flow communication between a porous material and a reservoir having a known volume, establishing a known gas pressure in said porous material and said reservoir, establishing a known gas pressure over an end wall of said porous material, said last mentioned gas pressure being different from said first mentioned gas pressure whereby a gas pressure differential is established at said end wall of said porous material, permitting transient flow of gas within said porous material resulting from establishment of said gas pressure differential, measuring the time required for the gas pressure within said porous material and said reservoir to attain a predetermined fraction of the higher of said two gas pressures, establishing again a known gas pressure in said porous material and said reservoir, establishing again a known gas pressure over an end wall of said porous material, said last mentioned gas pressure being different from said previously mentioned gas pressure whereby a gas pressure differential is established at said end wall of said porous material, the values of each of said two last mentioned gas pressures being different from the values of each of said two previously mentioned gas pressures but such that the gas pressure differential is the same as said previously mentioned gas pressure differential and the higher one of said two last mentioned gas pressures also being the higher one of said two previously mentioned gas pressures, permitting transient flow of gas within said porous material resulting from establishment of said last mentioned gas pressure differential, measuring the time required for the gas pressure within said porous material and said reservoir to attain the same previously mentioned fraction of the higher of said two last mentioned gas pressures, changing the volume of said reservoir, establishing a known gas pressure in said porous material and said reservoir, establishing a known gas pressure over an end wall of said porous material, said last mentioned gas pressure being different from said previously mentioned gas pressure whereby a gas pressure differential is established at said end wall of said porous material, said gas pressure differential being the same as said two previously mentioned gas pressure differentials and the values of each of said gas pressures being the same as the values of the pair of said two previously mentioned gas pressures having the highest values and the higher one of said two last mentioned gas pressures also being the higher one of said two pairs of previously mentioned gas pressures, permitting transient flow of gas within said porous material resulting from establishment of said last mentioned gas pressure differential, and measuring the time required for the gas pressure within said porous material and said reservoir to attain the same previously mentioned fraction of the higher of said last two mentioned gas pressures whereby the gas slip corrected permeability and the porosity of said porous material may be determined.

3. The process comprising the steps of establishing gas flow communication between a porous material and a reservoir having a known volume, establishing a known gas pressure in said porous material and said reservoir, establishing a known gas pressure over an end wall of said porous material, said last mentioned gas pressure being lower than said first mentioned gas pressure whereby a gas pressure differential is established at said end wall of said porous material, permitting transient flow of gas within said porous material resulting from establishment of said gas pressure differential, measuring the time required for the gas pressure within said porous material and said reservoir to attain a predetermined fraction of the higher of said two gas pressures, establishing again a known gas pressure in said porous material and said reservoir, establishing again a known gas pressure over an end wall of said porous material, said last mentioned gas pressure being lower than said previously mentioned gas pressure whereby a gas pressure differential is established at said end wall of said porous material, the values of each of said two last mentioned gas pressures being different than the values of each of said two previously mentioned gas pressures but such that the gas pressure differential is the same as said previously mentioned gas pressure differential, permitting transient flow of gas within said porous material resulting from establishment of said last mentioned gas pressure differential, measuring the time required for the gas pressure within said porous material and said reservoir to attain the same previously mentioned fraction of the higher of said two last mentioned gas pressures, changing the volume of said reservoir, establishing a known gas pressure in said porous material and said reservoir, establishing a known gas pressure over an end wall of said porous material, said last mentioned gas pressure being lower than said previously mentioned gas pressure whereby a gas pressure differential is established at said end wall of said porous material, said gas pressure differential being the same as said two previously mentioned gas pressure differentials and the values of each of said gas pressures being the same as the values of a pair of said previously mentioned gas pressures, permitting transient flow of gas within said porous material resulting from establishment of said last mentioned gas pressure differential, and measuring the time required for the gas pressure within said porous material and said reservoir to attain the same previously mentioned fraction of the higher of said last two mentioned gas pressures whereby the gas slip corrected permeability and the porosity of said porous material may be determined.

4. The process comprising the steps of establishing gas flow communication between a porous material and a reservoir having a known volume, establishing a known gas pressure in said porous material and said reservoir, establishing a known gas pressure over an end wall of said porous material, said last mentioned gas pressure being higher than said first mentioned gas pressure whereby a gas pressure differential is established at said end wall of said porous material, permitting transient flow of gas within said porous material resulting from establishment of said gas pressure differential, measuring the time required for the gas pressure within said porous material and said reservoir to attain a predetermined fraction of the higher of said two gas pressures, establishing again a known gas pressure in said porous material and said reservoir, establishing again a known gas pressure over an end wall of said porous material, said last mentioned gas pressure being higher than said previously mentioned gas pressure whereby a gas pressure differential is established at said end wall of said porous material, the values of each of said two last mentioned gas pressures being different from the values of each of said two previously mentioned gas pressures but such that the gas pressure differential is the same as said previously mentioned gas pressure differential, permitting transient flow of gas within said porous material resulting from establishment of said last mentioned gas pressure differential, measuring the time required for the gas pressure within said porous material and said reservoir to attain the same previously mentioned predetermined fraction of the higher of said two last mentioned gas pressures, changing the volume of said reservoir, establishing a known gas pressure in said porous material and said reservoir, establishing a known gas pressure over an end wall of said porous material, said last mentioned gas pressure being higher than said previously mentioned gas pressure whereby a gas pressure differential is established at said end wall of said porous material, said gas pressure differential being the same as said two previously mentioned gas pressure differentials and the values of each of said gas pressures being the same as the values of a pair of said previously mentioned gas pressures, permitting transient flow of gas within said porous material resulting from establishment of said last mentioned gas pressure differential, and measuring the time required for the gas pressure within said porous material and said reservoir to attain the same previously mentioned fraction of the higher of said last two mentioned gas pressures whereby the gas slip corrected permeability and the porosity of said porous material may be determined.

5. The process comprising the steps of establishing gas flow communication between a porous material and a reservoir having a known volume, establishing a known gas pressure in said porous material and said reservoir, establishing a known gas pressure over an end wall of said porous material, said last mentioned gas pressure being one-tenth of said first mentioned gas pressure whereby a gas pressure differential is established at said end wall of said porous material, permitting transient flow of gas within said porous material resulting from establishment of said gas pressure differential, measuring the time required for the gas pressure within said porous material and said reservoir to decrease to 0.55 its previous value, establishing again a known gas pressure in said porous material and said reservoir, establishing again a known gas pressure over an end wall of said porous material, said last mentioned gas pressure being one-tenth of said previously mentioned gas pressure whereby a gas pressure differential is established at said end wall of said porous material, the values of each of said two last mentioned gas pressures being different from the values of each of said two previously mentioned gas pressures, permitting transient flow of gas within said porous material resulting from establishment of said last mentioned gas pressure differential, measuring the time required for the gas pressure within said porous material and said reservoir to decrease to 0.55 its previous value, changing the volume of said reservoir, establishing a known gas pressure in said porous material and said reservoir, establishing a known gas pressure over an end wall of said porous material, said last mentioned gas pressure being one-tenth of said previously mentioned gas pressure whereby a gas pressure differential is established at said end wall of said porous material, the values of each of said gas pressures being the same as the values of a pair of said previously mentioned gas pressures, permitting transient flow of gas within said porous material resulting from establishment of said last mentioned gas pressure differential, and measuring the time required for the gas pressure within said porous material and said reservoir to decrease to 0.55 its previous value whereby the gas slip corrected permeability and the porosity of said porous material may be determined.

6. The process comprising the steps of establishing gas flow communication between a porous material and a reservoir having a known volume, establishing a known gas pressure in said porous material and said reservoir, establishing a known gas pressure over an end wall of said porous material, said last mentioned gas pressure being ten times said first mentioned gas pressure whereby a gas pressure differential is established at said end wall of said porous material, permitting transient flow of gas within said porous material resulting from establishment of said gas pressure differential, measuring the time required for the gas pressure within said porous material and said reservoir to increase to 0.55 of the higher of said two gas pressures, establishing again a known gas pressure in said porous material and said reservoir, establishing again a known gas pressure over an end wall of said porous material, said last mentioned gas pressure being ten times said previously mentioned gas pressure whereby a gas pressure differential is established at said end wall of said porous material, the values of each of said two last mentioned gas pressures being different from the values of each of said two previously mentioned gas pressures, permitting transient flow of gas within said porous material resulting from establishment of said last mentioned gas pressure differential, measuring the time required for the gas pressure within said porous material and said reservoir to increase to 0.55 of the higher of said two last mentioned gas pressures, changing the volume of said reservoir, establishing a known gas pressure in said porous material and said reservoir, establishing a known gas pressure over an end wall of said porous material, said last mentioned gas pressure being ten times said previously mentioned gas pressure whereby a gas pressure differential is established at said end wall of said porous material, the values of each of said gas pressures being the same as the values of a pair of said previously mentioned gas pressures, permitting transient flow of gas within said porous material resulting from establishment of said last mentioned gas pressure differential, and measuring the time required for the gas pressure within said porous material and said reservoir to increase to 0.55 of the higher of said two last mentioned gas pressures whereby the gas slip corrected permeability and the porosity of said porous material may be determined.

7. The process comprising the steps of establishing gas flow communication between a porous material and a reservoir having a known volume, establishing a known gas pressure in said porous material and said reservoir, establishing a known gas pressure over an end wall of said porous material, said two last mentioned gas pressures differing from each other by a factor of ten whereby a gas pressure differential is established at said end wall of said porous material, permitting transient flow of gas within said porous material resulting from establishment of said gas pressure differential, measuring the time required for the gas pressure within said porous material and said reservoir to attain a value of 0.55 of the higher of said two gas pressures, establishing again a known gas pressure in said porous material and said reservoir, establishing again a known gas pressure over an end wall of said porous material, said two last mentioned gas pressures differing from each other by a factor of ten whereby a gas pressure differential is established at said end wall of said porous material, the values of each of said two last mentioned gas pressures being different from the values of each of said two previously mentioned gas pressures and the higher one of said two last mentioned gas pressures also being the higher one of said two previously mentioned gas pressures, permitting transient flow of gas within said porous material resulting from establishment of said last mentioned gas pressure differential, measuring the time required for the gas pressure within said porous material and said reservoir to attain a value of 0.55 of the higher of said two last mentioned gas pressures, changing the volume of said reservoir, establishing a known gas pressure in said porous material and said reservoir, establishing a known gas pressure over an end wall of said porous material, said two last mentioned gas pressures differing from each other by a factor of ten whereby a gas pressure differential is established at said end wall of said porous material, the values of each of said two last mentioned gas pressures being the same as the values of a pair of said previously mentioned gas pressures and the higher one of said two last mentioned gas pressures also being the higher one of said two pairs of previously mentioned gas pressures, permitting transient flow of gas within said porous material resulting from establishment of said last mentioned gas pressure differential, and measuring the time required for the gas pressure within said porous material and said reservoir to attain a value of 0.55 of the higher of said two last mentioned gas pressures whereby the gas slip corrected permeability and the porosity of said porous material may be determined.

8. The process comprising the steps of establishing gas flow communication between a porous material and a reservoir having a known volume, establishing a known gas pressure in said porous material and said reservoir, establishing a known gas pressure over an end wall of said porous material, said two last mentioned gas pressures differing from each other by a factor of ten whereby a gas pressure differential is established at said end wall of said porous material, permitting transient flow of gas within said porous material resulting from establishment of said gas pressure differential, measuring the time required for the gas pressure within said porous material and said reservoir to attain a value of 0.55 of the higher of said two gas pressures, establishing again a known gas pressure in said porous material and said reservoir, establishing again a known gas pressure over an end wall of said porous material, said two last mentioned gas pressures differing from each other by a factor of ten whereby a gas pressure differential is established at said end wall of said porous material, the values of each of said two last mentioned gas pressures being different from the values of each of said two previously mentioned gas pressures and the higher one of said two last mentioned gas pressures also being the higher one of said two previously mentioned gas pressures, permitting transient flow of gas within said porous material resulting from establishment of said last mentioned gas pressure differential, measuring the time required for the gas pressure within said porous material and said reservoir to attain a value of 0.55 of the higher of said two last mentioned gas pressures, changing the volume of said reservoir, establishing a known gas pressure in said porous material and said reservoir, establishing a known gas pressure over an end wall of said porous material, said two last mentioned gas pressures differing from each other by a factor of ten whereby a gas pressure differential is established at said end wall of said porous material, the values of each of said two last mentioned gas pressures being the same as the values of the pair of said two previously mentioned gas pressures having the highest values and the higher one of said two last mentioned gas pressures also being the higher one of said two pairs of previously mentioned gas pressures, permitting transient flow of gas within said porous material resulting from establishment of said last mentioned gas pressure differential, and measuring the time required for the gas pressure within said porous material and said reservoir to attain a value of 0.55 of the higher of said two last mentioned gas pressures whereby the gas slip corrected permeability and the porosity of said porous material may be determined.

9. The process comprising the steps of establishing gas flow communication between a porous material and a reservoir having a known volume, establishing a known gas pressure in said porous material and said reservoir, establishing a known gas pressure over an end wall of said porous material, said last mentioned gas pressure being one-tenth of said first mentioned gas pressure whereby a gas pressure differential is established at said end wall of said porous material, permitting transient flow of gas within said porous material resulting from establishment of said gas pressure differential, measuring the time required for the gas pressure within said porous material and said reservoir to decrease to 0.55 of its previous value, establishing again a known gas pressure in said porous material and said reservoir, establishing again a known gas pressure over an end wall of said porous material, said last mentioned gas pressure being one-tenth of said previously mentioned gas pressure whereby a gas pressure differential is established at said end wall of said porous material, the values of each of said two last mentioned gas pressures being different from the values of each of said two previously mentioned gas pressures, permitting transient flow of gas within said porous material resulting from establishment of said last mentioned gas pressure differential, measuring the time required for the gas pressure within said porous material and said reservoir to decrease to 0.55 of its previous value, changing the volume of said reservoir, establishing a known pressure of a gas in said porous material and said reservoir, establishing a gas pressure over an end wall of said porous material, said last mentioned gas pressure being one-tenth of said previously mentioned gas pressure whereby a gas pressure differential is established at said end wall of said porous material, the values of each of said two last mentioned gas pressures being the same as the values of the pair of said two previously mentioned gas pressures having the highest values, permitting transient flow of gas within said porous material resulting from establishment of said last mentioned gas pressure differential, and measuring the time required for the gas pressure within said porous material and said reservoir to decrease to 0.55 of its previous value whereby the gas slip corrected permeability and the porosity of said porous material may be determined.

10. The process comprising the steps of establishing gas flow communication between a porous material and a reservoir having a known volume, establishing a known gas pressure in said porous material and said reservoir, establishing a known gas pressure over an end wall of said porous material, said last mentioned gas pressure being ten times said first mentioned gas pressure whereby a gas pressure differential is established at said end wall of said porous material, permitting transient flow of gas within said porous material resulting from establishment of said gas pressure differential, measuring the time required for the gas pressure within said porous material and said reservoir to increase to 0.55 of the higher of said two gas pressures, establishing again a known gas pressure in said porous material and said reservoir, establishing again a known gas pressure over an end wall of said porous material, said last mentioned gas pressure being ten times said previously mentioned gas pressure whereby a gas pressure differential is established at said end wall of said porous material, the values of each of said two last mentioned gas pressures being different from the values of each of said two previously mentioned gas pressures, permitting transient flow of gas within said porous material resulting from establishment of said last mentioned gas pressure differential, measuring the time required for the gas pressure within said porous material and said reservoir to increase to 0.55 of the higher of said two last mentioned gas pressures, changing the volume of said reservoir, establishing a known gas pressure in said porous material and said reservoir, establishing a known gas pressure over an end wall of said porous material, said last mentioned gas pressure being ten times said previously mentioned gas pressure whereby a gas pressure differential is established at said end wall of said porous material, the values of each of said two last mentioned gas pressures being the same as the values of the pair of said two previously mentioned gas pressures having the highest values, permitting transient flow of gas within said porous material resulting from establishment of said last mentioned gas pressure differential, and measuring the time required for the gas pressure within said porous material and said reservoir to increase to 0.55 of the higher of said two last mentioned gas pressures whereby the gas slip corrected permeability and the porosity of said porous material may be determined.

References Cited in the file of this patent

UNITED STATES PATENTS

| | | |
|---|---|---|
| 2,323,556 | Mattocks | July 6, 1943 |
| 2,392,637 | Boehler | Jan. 8, 1946 |
| 2,604,779 | Purcell | July 29, 1952 |
| 2,633,015 | Morris | Mar. 31, 1953 |
| 2,705,418 | Reichertz et al. | Apr. 5, 1955 |
| 2,724,963 | Ten Brink | Nov. 29, 1955 |